United States Patent Office 2,732,347
Patented Jan. 24, 1956

2,732,347

LUMINESCENT ZINC, CADMIUM, AND ZINC-CADMIUM SULPHIDES

Harold F. Ward, Rugby, England, assignor to General Electric Company, a corporation of New York No Drawing. Application May 31, 1950,
Serial No. 165,353

Claims priority, application Great Britain
December 21, 1948

9 Claims. (Cl. 252—301.6)

This invention relates to the crystalline substances, generally known as phosphors, which emit radiation of wavelengths different from the wavelengths at which they are excited. This application is a continuation-in-part of my copending application, Serial No. 129,169, filed November 23, 1949, now abandoned, assigned to the same assignee as the present application.

Such substances usually consist of two constituents, the main constituent or matrix and an auxiliary constituent or activator. Sometimes a third component or flux is used, particularly in cases where crystal growth is important, as in the zinc, cadmium, and zinc-cadmium sulphides. These constituents are usually intimately mixed and then heated together under controlled conditions in order to develop the ultimate luminescent properties of the phosphor. It is well known that although the flux is used, in general, for the purpose of crystallization, it has a very considerable influence on the physical and radiation qualities of the phosphor.

In general, in the case of zinc, cadmium, and zinc-cadmium sulphides, a chloride of an alkali or alkaline earth metal is used as the flux. The use of fluxes of this kind imposes certain limitations on the characteristics of the phosphor. One of these limitations is that under excitation the color of the radiation emitted by the phosphor changes with changes in the temperature of the phosphor. A second limitation is that the phosphor blackens when excited by ultra-violet radiation or cathode rays. This condition is especially true when traces of air or moisture are present. A third limitation in the characteristics of the phosphor fluxed in above manner is its inability to absorb large quantities of an activator.

Accordingly, it is an object of my invention to provide improved zinc sulphide, cadmium sulphide and zinc-cadmium sulphide phosphors in which the aforementioned limitations in the characteristics of the phosphor are substantially eliminated.

It has been found that the above disadvantages may be substantially, if not wholly, eliminated by using an alkali metal phosphate or ammonium phosphate in partial or complete substitution for the alkali metal, alkaline earth metal or ammonium chloride flux heretofore commonly employed. Preferably one or more of the ammonium phosphates is used.

When an ammonium phosphate is used, the quantity to be employed is influenced by the presence of ammonium chloride in the sulphide. The proportion of phosphate employed in the phosphor should be in excess, by weight, of the chloride content. It should be noted that with large proportions of a chloride and, therefore, correspondingly larger proportions of phosphate, the difficulty of reducing the phosphor to a sufficiently finely divided state for practical use is increased. It has been found that ammonium chloride, for example, in a proportion of about 2–5% by weight of the zinc sulphide, cadmium sulphide, or zinc-cadmium sulphide has a beneficial effect on the brightness of the phosphor when fluxed with ammonium phosphate.

With zinc sulphide, cadmium sulphide, or zinc-cadmium sulphide phosphors containing 2–5% by weight of alkali metal chloride, ammonium phosphate in the proportions 6%–20% is preferably used.

The use of ammonium phosphate or alkali metal phosphate as a flux, with or without ammonium, alkali metal, or alkaline earth metal chloride has certain advantages. A flux of the above kind enhances the ability of the phosphor to radiate light when excited by ultra-violet rays without any appreciable change in the color of the light at phosphor temperatures of up to 120° C. and with a smaller broadening of spectra and fall of light output than known zinc, cadmium, or zinc-cadmium sulphide phosphors when activated with silver up to 180° C. Secondly, the use of a flux of the above kind results in much less blackening of the zinc sulphide, cadmium sulphide, and zinc-cadmium sulphide phosphor under radiation by ultra-violet or cathode rays than is characteristic of zinc, cadmium, and zinc-cadmium sulphides when fluxed only with alkali metal chlorides, alkaline earth chlorides or ammonium chloride. Thirdly, the use of a flux of the above kind with zinc sulphide, cadmium sulphide, and zinc-cadmium sulphide phosphors permits incorporation of higher concentrations of an activator in the phosphor than heretofore thought possible. In particular, higher concentrations of a silver activator may be used. For instance, in the case of zinc sulphide, cadmium sulphide, and zinc-cadmium sulphide phosphors activated by silver, about .001%–.015% of silver by weight heretofore has been the practical range of silver content in the phosphor while now with the present phosphate flux, the amount of silver that may be used ranges from 0.02% up to 0.2% of silver by weight.

I will now describe ways in which improved phosphors may be prepared in accordance with the invention.

*Example I*

100 gms. of pure zinc sulphide having a chloride content of not less than 2% or not more than 5%, by weight, is mixed with 20 gms. of ammonium hydrogen phosphate containing 0.072% of silver, by weight. If the zinc sulphide is free of chloride, then 2.5% of pure alkali metal alkaline earth metal or ammonium chloride can be added to the mix. The silver is usually added to the ammonium phosphate as a solution of silver nitrate in alcohol. After sufficient mixing, the mixture is fired in a silica crucible with suitable lid in a furnace at 1000° C.–1150° C. for thirty minutes. When cool, the phosphor may be ground, washed in water or ammonium hydroxide, filtered and dried. The use of an ammonium hydroxide wash materially decreases the difficulty of reducing the phosphor to a fine powder.

By heating at a temperature of between 800° and 850° C., the resultant substance may be more readily reduced to a fine powder. Any other coating treatments may be added to this phosphor without deleterious effect.

This phosphor luminesces blue under the action of ultra-violet light or cathode rays.

*Example II*

50 gms. of pure zinc sulphide and 50 gms. of pure cadmium sulphide having a chloride content of not less than 2% or not more than 5%, by weight, is mixed with 20 gms. of ammonium hydrogen phosphate containing 0.072% of silver, by weight. If the zinc and cadmium sulphides are free of chlorides, then 2.5% of pure alkali metal, alkaline earth metal or ammonium chloride can be added to the mix.

The silver is usually added to the ammonium phosphate as a silver nitrate solution. After sufficient mixing, the mixture is fired in a silica crucible with suitable lid in a furnace at 800°–850° C. for forty-five minutes. When cool, the phosphor may be washed in water or ammonium hydroxide, filtered and dried. This gives a phosphor with a deep yellow luminescence. The use of an ammonium hydroxide wash materially decreases the difficulty of reducing phosphor to a fine powder. Any other coating treatments may be added to this phosphor without deleterious effect.

The luminescent color of the above phosphor depends upon the proportions of zinc and cadmium sulphide employed in the starting material. A proportion of 20% by weight cadmium sulphide gives a blue-green luminescence while 60% by weight cadmium sulphide produces an orange luminescence.

*Example III*

100 gms. of pure cadmium sulphide having a chloride content of not less than 2% or not more than 5% by weight is mixed with 20 gms. of ammonium hydrogen phosphate containing about 0.072% by weight of Ag. If the cadmium sulphide is chloride free, then 2.5% of pure ammonium chloride can be added to the mix. The silver is usually added as silver nitrate. After mixing, the mixture is fired in a silica crucible with a suitable lid in a furnace at 800°–850° for forty-five minutes. When cool, the phosphor may be washed in water or ammonium hydroxide, filtered and dried. The luminescent color of this phosphor is a deep red.

What I claim as new and desire to secure by Letters Patent of the United States is:

1. A phosphor consisting essentially of the fired reaction product of zinc sulphide which is activated by about 0.02–0.2% of silver by weight, and a flux consisting of 2–5% by weight of a chloride of a group consisting of alkali metals, the alkaline earths, and ammonium and 6–20% by weight of ammonium phosphate.

2. A phosphor consisting essentially of the fired reaction product of zinc sulphide which is activated by about 0.02–0.2% of silver by weight, and a flux consisting of 2–5% by weight of ammonium chloride and 6–20% by weight of ammonium phosphate.

3. A phosphor consisting essentially of the fired reaction product of zinc sulphide which is activated by about 0.02–0.2% silver by weight, and a flux consisting of 2–5% of a chloride of a group consisting of alkali metals, the alkaline earths, and ammonium and 6–20% by weight of an alkali metal phosphate.

4. A phosphor consisting essentially of the fired reaction product of a sulphide from the group consisting of zinc sulphide, cadmium sulphide, and zinc-cadmium sulphide, 0.02–0.2 per cent of silver, by weight, as an activator, and a flux consisting of 2–5 per cent, by weight, of a chloride and 6–20 per cent, by weight, of ammonium phosphate, said chloride taken from the group consisting of alkali metal, alkaline earth, and ammonium chlorides.

5. A phosphor consisting essentially of the fired reaction product of a sulphide from the group consisting of zinc sulphide, cadmium sulphide, and zinc-cadmium sulphide, 0.02–0.2 per cent of silver, by weight, as an activator, and a flux consisting of 2–5 per cent, by weight, of ammonium chloride and 6–20 per cent, by weight, of ammonium phosphate.

6. A phosphor consisting essentially of the fired reaction product of a sulphide from the group consisting of zinc sulphide, cadmium sulphide, and zinc-cadmium sulphide, 0.02–0.2 per cent silver, by weight, as an activator, and a flux consisting of 2–5 per cent, by weight, of a chloride and 6–20 per cent, by weight, of an alkali metal phosphate, said chloride taken from the group consisting of alkali metal, alkaline earth, and ammonium chlorides.

7. A phosphor consisting essentially of the fired reaction product of zinc-cadmium sulphide which is activated by about 0.02–0.2 per cent of silver, by weight, and a flux consisting of 2–5 per cent, by weight, of a chloride of a group consisting of alkali metals, the alkaline earths, and ammonium, and 6–20 per cent, by weight, of ammonium phosphate.

8. A phosphor consisting essentially of the fired reaction product of zinc-cadmium sulphide which is activated by about 0.02–0.2 per cent of silver, by weight, and a flux consisting of 2–5 per cent, by weight, of ammonium chloride and 6–20 per cent, by weight, of ammonium phosphate.

9. A phosphor consisting essentially of the fired reaction product of zinc-cadmium sulphide which is activated by about 0.02–0.2 per cent silver, by weight, and a flux consisting of 2–5 per cent of a chloride and 6–20 per cent, by weight, of an alkali metal phosphate, said chloride taken from the group consisting of alkali metal, alkaline earth, and ammonium chlorides.

References Cited in the file of this patent

FOREIGN PATENTS 473,715  Great Britain _____ Oct. 19, 1937